United States Patent
Jost et al.

(10) Patent No.: US 7,251,820 B1
(45) Date of Patent: Jul. 31, 2007

(54) METHOD AND SYSTEM FOR AUTOMATICALLY LOCATING SET-TOP TERMINALS WITHIN A CABLE TELEVISION SYSTEM

(75) Inventors: Arthur Jost, Mt. Laurel, NJ (US); Stephen Abert, Chalfont, PA (US); Reem Safadi, Horsham, PA (US)

(73) Assignee: General Instruments Corporation, Horsham, PA (US)

( * ) Notice: Subject to any disclaimer, the term of this patent is extended or adjusted under 35 U.S.C. 154(b) by 0 days.

(21) Appl. No.: 09/440,260

(22) Filed: Nov. 15, 1999

(51) Int. Cl.
*H04N 7/173* (2006.01)
(52) U.S. Cl. ..................... 725/107
(58) Field of Classification Search .......... 725/107, 725/118, 119, 120; 340/3.5, 3.51, 3.52; 370/257, 370/393; 709/223, 225, 238
See application file for complete search history.

(56) References Cited

U.S. PATENT DOCUMENTS

| | | | |
|---|---|---|---|
| 5,432,542 A | | 7/1995 | Thibadeau |
| 5,455,619 A | | 10/1995 | Truckenmiller |
| 5,563,883 A | * | 10/1996 | Cheng .................. 370/449 |
| 5,574,495 A | * | 11/1996 | Caporizzo ............ 725/107 |
| 5,606,725 A | * | 2/1997 | Hart .................... 725/131 |
| 6,202,088 B1 | * | 3/2001 | Corrigan et al. ....... 709/217 |
| 6,272,150 B1 | * | 8/2001 | Hrastar et al. ......... 370/486 |
| 6,351,773 B1 | * | 2/2002 | Fijolek et al. ......... 709/228 |
| 6,425,132 B1 | * | 7/2002 | Chappell ............... 725/107 |
| 6,463,588 B1 | * | 10/2002 | Jenkins et al. ......... 725/127 |
| 6,603,758 B1 | * | 8/2003 | Schmuelling et al. .. 370/352 |

FOREIGN PATENT DOCUMENTS

EP 0594353 A1 4/1994

OTHER PUBLICATIONS

Henderson, J.G.N., "All-format decoders and set-top boxes," Oct. 1998, Image Processing, 1998. ICIP 98. Proceedings. 1998 International Conference, vol. 1, p. 4.*
International Preliminary Examination Report, dated Feb. 22, 2002.
Written Opinion from International Preliminary Examination Authority, dated Sep. 17, 2001.

* cited by examiner

*Primary Examiner*—Andrew Y. Koenig
(74) *Attorney, Agent, or Firm*—Benjamin D. Driscoll

(57) ABSTRACT

A cable television system automatically locates set-top terminals within the system with respect to the specific equipment through which the set-top terminal communicates with the system controller. This location of the terminal is used to configure the terminal to operate properly within the system and with respect to its physical location and to improve the overall operating efficiency of the system. Identifying the location of terminals can also facilitate better trouble-shooting and characterization of the cable plant by providing logical and physical network topology information. Each terminal's attributes are also registered with the system controller. The controller can also effect automatic configuration of set-top terminals purchased through a retail outlet and installed by consumers.

19 Claims, 2 Drawing Sheets

METHOD AND SYSTEM FOR AUTOMATICALLY LOCATING SET-TOP TERMINALS WITHIN A CABLE TELEVISION SYSTEM

FIELD OF THE INVENTION

The present invention relates to the field of cable television. More particularly, the present invention relates to the field of installing, locating and initializing set-top terminals within a cable television system.

BACKGROUND OF THE INVENTION

Cable television systems allow subscribers access to dozens or even hundreds of channels of television programming. This wide variety of programming accounts for the great popularity of cable television. Additionally, the current trend is for cable television systems to provide additional services such as pay-per-view programming, video-on-demand programming, internet access and, eventually, telephony.

In advanced cable television systems, each subscriber is typically provided with a set-top terminal. The set-top terminal is a box of electronic equipment that is used to connect the subscriber's television, or other electronic equipment, to the cable television system. The set-top terminal processes the signal received from the cable television system to provide the services of the cable system to subscribers.

FIG. 1 illustrates a typical cable television system. The cable television signal, and any other services offered over the cable system, originate at the headend facility (101). The headend (101) may be the central operating facility of the cable system operator, or may be one of several regional headend facilities.

The cable television signal is distributed from the headend (101) to hubs (102). Typically, the communication between the headend (101) and the hubs (102) is accomplished by optical signaling over a fiber optic cable network (108). The hubs (102), in turn, distribute the cable television signal to a number of nodes (103). As with the headend-hub communication, the link between the hubs (102) and nodes (103) is typically a fiber optic cable network (109).

At each node (103), the optical signal from the hubs (102) is converted into a radio frequency (RF) signal for distribution on a co-axial cable network (104 to 106) to individual subscribers. A cable television system like the one described here, that includes both optical signaling over fiber optical cable and RF signaling over co-axial cable, is called a Hybrid Fiber Co-axial (HFC) network.

The co-axial cable network from the nodes (103) is divided into trunk lines (104), which branch into feeder lines (105), which branch into tap lines (106), resulting in the tree structure illustrated in FIG. 1. The tap lines (106) are connected to the set-top terminals (107) of individual subscribers to the cable system.

To support advanced features of the cable television system, it is necessary for the set-top terminal (107) to be able to, not just receive the cable television signal from the headend (101), but also communicate back "upstream" and send data or messages to the headend (101). In order to accomplish this, a return signal path may be provided within the system illustrated in FIG. 1.

For example, the set-top terminal (107) can use the tap line (106) to send a message upstream over the feeder (105) and trunk (104) lines to the node (103). To eliminate the "collision" of data coming upstream from the terminal (107) (e.g., poll responses) with the downstream signal from the headend (101), there will be a designated frequency at which a set-top terminal (107) must communicate upstream to the node (103). This frequency may be different for different nodes (103). Once the upstream signal from the set-top terminal (107) reaches the node (103), it is demodulated by a return path demodulator (RPD) (110).

The terminals and signal distribution devices in the headend (101), hubs (102) and nodes (103) are all controlled by a system controller (112). The controller (112) may be located at the central headend facility (not shown) and may control several regional headends (101). The controller (112) is connected to the regional headends (101), hubs (102) and nodes (103) by a separate data communication network (111), typically an ethernet. The return path demodulator (110) of the node (103) uses the ethernet (111) to transmit any messages received from the set-top terminal (107) via the return path demodulator (110) to the controller (112). The controller (112) can then initiate any response necessary to the set-top terminal communication.

Alternatively, each of the set-top terminals (107) may be connected to a telephone line and may communicate with the controller (112) by placing a call on that phone line to the controller (112). The controller (112) will have a bank of modems for receiving telephone calls from set-top terminals (107). This system avoids the need to provide a two-way data path within the cable television system itself, but also requires the expense of connecting each set-top terminal to a phone line.

There are a number of problems in operating the cable television systems described above. One prominent problem area arises when new set-top terminals are added to the system. When a new terminal is added, it must be properly configured to work within the system of the cable system operator. Each cable system is unique and may not precisely follow the hierarchy described above.

When new subscribers are added, an electronic billing system usually receives data about the new subscriber via manual entry and then determines and assigns attributes to each terminal to allow the terminal to operate within the system. Such attributes may include a credit limit for video services ordered from the terminal, the channel map for the television channels available to the terminal, the time zone in which the terminal resides, etc.

Some or all of these attributes may depend on where the terminal is located within the system, for example, the local time zone of the terminal. These location-dependent attributes are important. For example, if the terminal is accessing an electronic programming guide, the appropriate guide may be dictated, in part, by the time zone in which the terminal is located.

Additionally, some particular channels, perhaps those of local interest, may be available in some parts of the cable system but not others. Thus, some terminals in the system may need a different channel map or a different electronic programming guide than others. In another example, as noted above, the frequency at which a set-top terminal (107) communicates upstream may vary depending on the node (103) to which the terminal (107) is connected.

Thus, in order for a new terminal (107) to be successfully added to the system, its location must be identified so that it can be configured properly. However, the electronic billing system usually has limited information on where the new terminal is being physically added to the system and that information is often inaccurate, being subject to human error during input. Thus, in order for a new terminal to be properly configured based on its location within the system, a technician is usually required to install the set-top terminal, note its location and configure the terminal appropriately. This requires an expense in time and trained personnel to properly add new subscribers to the system. This is especially problematic for the retail distribution model where subscribers purchase the terminal at a retail outlet and install it themselves.

Consequently, there is a need in the art for a system and method allowing the controller (112) to automatically determine the physical location of a set-top terminal within the system so as to more easily configure and initialize that terminal based on its location within the system.

SUMMARY OF THE INVENTION

It is an object of the present invention to meet the above-described needs and others. Specifically, it is an object of the present invention to provide a system and method allowing the system controller to automatically determine the physical location of a set-top terminal within the system so as to properly configure and initialize that terminal based on its location within the system.

Additional objects, advantages and novel features of the invention will be set forth in the description which follows or may be learned by those skilled in the art through reading these materials or practicing the invention. The objects and advantages of the invention may be achieved through the means recited in the attached claims.

To achieve these stated and other objects, the present invention may be embodied and described as a system for locating set-top terminals within a cable television system and using that location information for the terminals to improve the efficient operation of the cable television system. A preferred embodiment of the present invention is a system including: a system controller; a population of set-top terminals; a number of downstream plants on which video and other services are available and with which the system controller transmits data messages to the set-top terminals; and a number of upstream plants with which the set-top terminals transmit messages to the system controller. The controller determines the location of each set-top terminal within the system by determining which upstream plant transmits a message to the system controller from a particular set-top terminal. The controller then identifies a downstream plant associated with that upstream plant. Preferably each upstream plant is associated with only one downstream plant.

The controller may transmit a request message to a particular set-top terminal causing that set-top terminal to respond by transmitting the message to the system controller with which the controller locates the set-top terminal. Alternatively, the set-top terminal may transmit the first message to the controller without having received a request message from the controller. The set-top terminal may transmits the first message to the controller in response to a command entered by a user to the set-top terminal. This is the preferred embodiment for the retail distribution model.

The controller assigns attributes for each set-top terminal based on the location of that set-top terminal. Preferably, the controller associates attributes for the set-top terminals with each upstream plant and downstream plant in the system. The controller can then assign attributes for each individual set-top terminal using the attributes associated with the upstream plant that transmits messages from that terminal to the controller and the attributes associated with the downstream plant which corresponds to that upstream plant.

The controller can use the location information generated for each set-top terminal when polling the set-top terminals for data. The controller preferably polls the set-top terminals for data by signaling selected multiple terminals simultaneously and selecting the selected terminals based on determined locations of the selected terminals to eliminate data collisions during the polling that would otherwise occur due to overlapping poll responses on the same upstream path (204).

The controller may also identify an upstream or downstream plant that is malfunctioning by identifying a group of the set-top terminals that fail to communicate with the controller. If the group of set-top terminals have locations defined, in part, by a common upstream or downstream plant, that common upstream or downstream plant is likely malfunctioning.

The present invention also encompasses a method of locating set-top terminals within a cable television system and using that location information for the terminals to improve efficient operation of the cable television system. The method corresponds to the system described above and includes the steps of determining which upstream plant out of a number of upstream plants transmits a message to a system controller from a particular set-top terminal; and identifying a downstream plant associated with that upstream plant that transmits the first message from the set-top terminal. The location of the set-top terminal within the system is defined, in part, by the identification of the upstream plant carrying the terminal's upstream messages and the downstream plant associated with that upstream plant.

BRIEF DESCRIPTION OF THE DRAWINGS

The accompanying drawings illustrate the present invention and are a part of the specification. Together with the following description, the drawings demonstrate and explain the principles of the present invention.

DETAILED DESCRIPTION OF THE PREFERRED EMBODIMENTS

Figure 2:
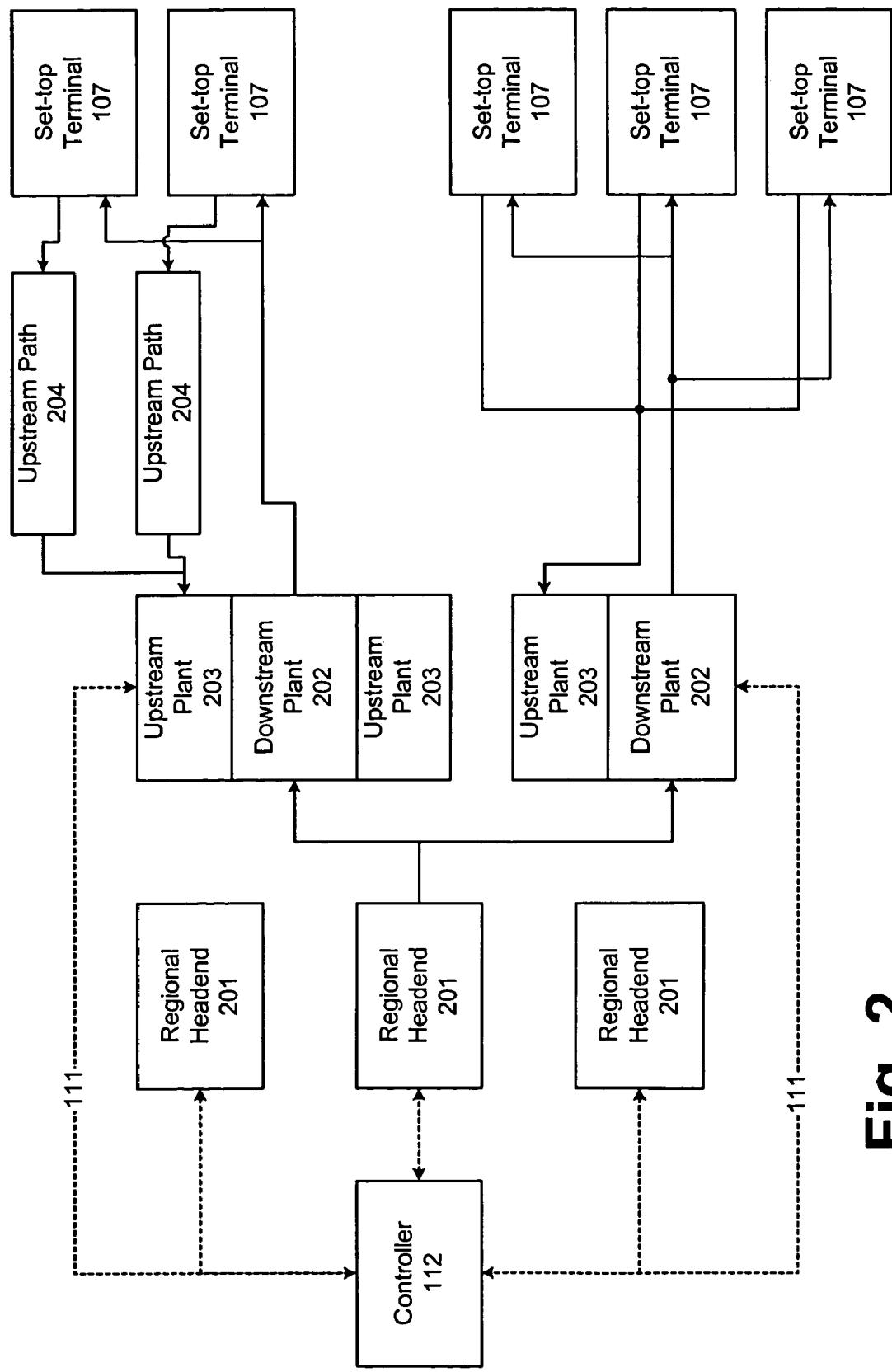
FIG. 2 is a block diagram of a cable television system operating according to the present invention.

Using the drawings, the preferred embodiments of the present invention will now be explained. FIG. 2 illustrates a cable television system according to the principles of the present invention.

The cable television system shown in FIG. 2 is comprised of five basic elements: (1) one or more headend facilities (201); (2) a number of downstream plants (202); (3) a number of set-top terminals (107); (4) a number of upstream paths (204); and (5) a number of upstream plants (203). Each of these elements will be discussed below.

Figure 1:
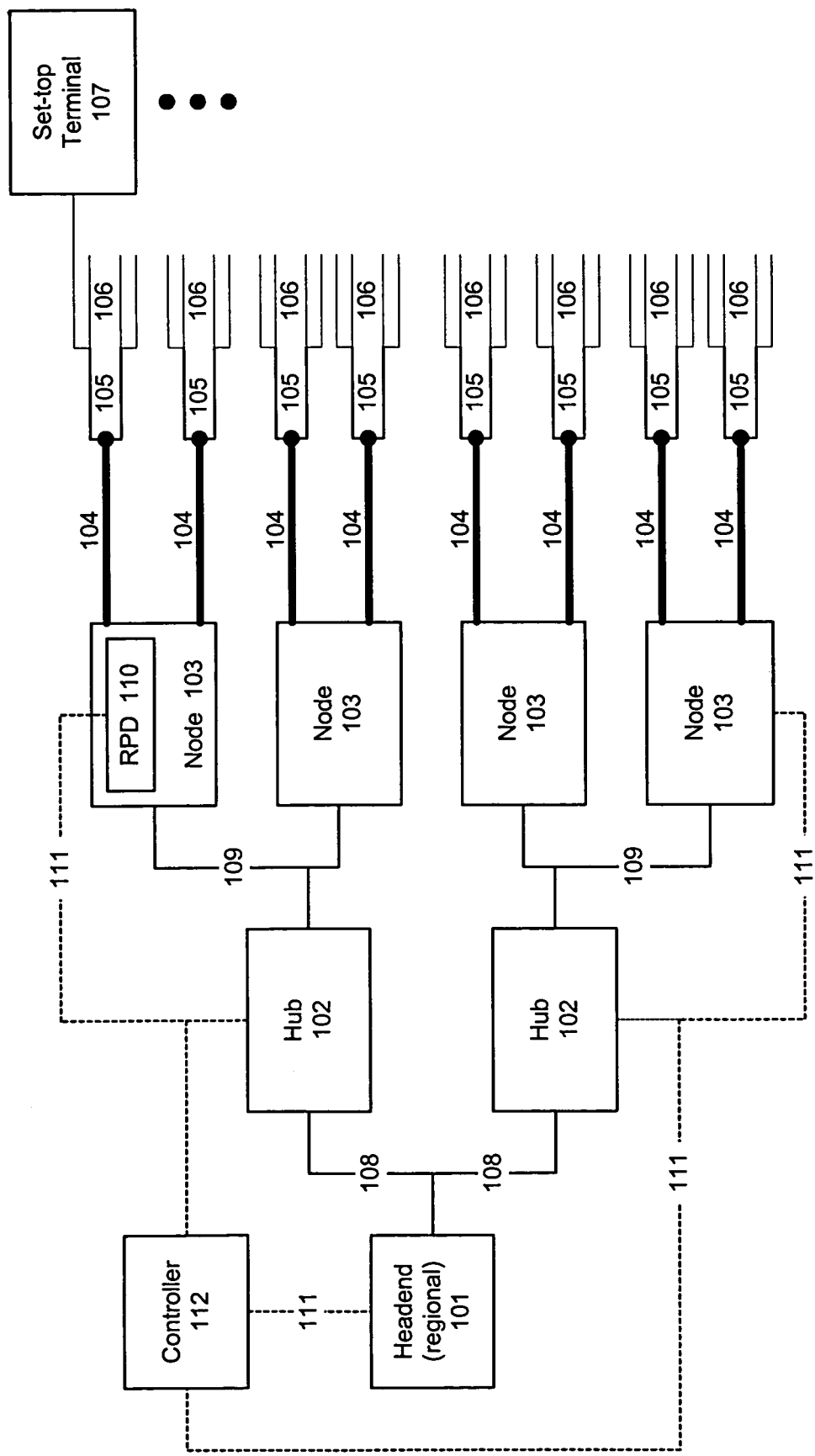
FIG. 1 is a block diagram of a cable television system in which the present invention can be practiced.

The system illustrated in FIG. 2 is an abstraction of that shown in FIG. 1 and like elements are denominated with identical reference numerals. Consequently, as used herein, the upstream and downstream plants are defined logical constructs and are not required to exactly match the physical configuration of all corresponding portions of the cable system.

Several regional headends (201) are illustrated in the example of FIG. 2. Each regional headend (201) is a facility from which cable television signals and services originate within the cable system. A central facility or main headend may control the various regional headends (201) using the controller (112). The controller (112) is typically located at the central headend.

Each downstream plant (202) includes the equipment necessary to deliver signals and services from a headend (201) to a group of set-top terminals (107) belonging to individual subscribers. Each downstream plant (202) may include a particular and unique hub/node (102, 103) combination and the trunk, feeder and tap lines (104 to 106) connecting that node (103) to a group of set-top terminals (107). In a typical configuration, this would result in a one-to-one correspondence between hubs (102) and downstream plants (202), i.e., each hub (102) would correspond to a different downstream plant (202). Since a hub (102) typically has several nodes associated with it, each downstream plant (202) would also includes several nodes.

Each upstream path (204) includes the particular trunk, feeder and tap lines (104 to 106) between a particular set-top terminal (107) and a node (103). Different set-top terminals (107) may have different upstream paths (204). Multiple upstream paths (204) may be defined and exist on a single set of trunk, feeder and tap lines (104 to 106) by assigning multiple upstream transmission frequencies on that set of trunk, feeder and tap lines (104 to 106). In this manner, each different upstream transmission frequency corresponds to a different upstream path (204). A characteristic of upstream paths (204) is that there will never be transmission collisions across different upstream paths (204), allowing terminals (107) on different upstream paths (204) to transmit messages simultaneously.

All upstream paths (204) lead to an upstream plant (203) which is defined as the equipment necessary to transmit signals or messages received over the upstream path (204) from the set-top terminal (107) to the controller (112). Each upstream plant (203) includes a return path demodulator (110) and a connection to the ethernet or other data communication network (111) between the upstream plant (203) and the system controller (112). According to the principles of the present invention, each upstream path (204) connects to a single upstream plant (203). Each upstream plant (203) is associated with a single downstream plant (202). Each downstream plant (203) is associated with a single headend (201).

However, a headend (201) may have several downstream plants (202) associated therewith. A downstream plant (202) similarly may have several upstream plants (203) associated therewith. And, an upstream plant (203) may have several upstream paths (204) associated therewith. These relationships are illustrated in FIG. 2.

Whenever, a new set-top terminal (107) is added to the system, it is registered with the controller (112) so that it can be assigned the proper attributes for subsequent interaction with the system. These attributes, once assigned, are stored by the controller (112) for subsequent use in communicating with the terminal (107). As shown in FIG. 2, the system controller (112), with is typically located at a central headend facility, may control a number of different regional headends (201).

A new terminal (107) may be added to the system in one of at least two ways. First, the operator may add the new terminal to the electronic billing system which then prompts the controller (112) to register the new terminal. Alternatively, the operator and/or billing system may not have information on the new terminal until it is discovered by the controller (112) as part of the automatic discovery process of the present invention which will be described in more detail below.

The latter case is preferred for the retail distribution model when the cable system may not have advance notice that a particular terminal (107) is going to be installed in the system. In this situation, the controller (112) would discover the terminal (107) and inform the rest of the system (i.e., the operator or the electronic billing system) of the discovered terminal (107) and its location attributes.

In one preferred embodiment of the present invention, the controller (112) sends out a request message that the set-top terminals will respond to. The response message will identify the set-top terminal sending the response message so that the controller (112) can distinguish a response from each terminal (107) in the system. Preferably, the response message fits within a single digital data packet in the upstream transport stream to minimize the amount of upstream data and the chance that upstream transmissions will collide or interfere with each other.

The response message is transmitted over the upstream path (204) utilized by the terminal (107) to the upstream plant (203) associated with that terminal. Each upstream plant (203) is uniquely identifiable within the network (111), e.g., the ethernet, connecting that upstream plant (203) to the controller (112). Consequently, the controller (112) will be able to identify the upstream plant (203) from which the response from a given terminal (107) is sent. Thus, the controller (112) can identify the upstream plant (203) and an associated downstream plant (202) to which each set-top terminal (107) is connected.

This data "locates" the terminal (107) within the system. Consequently, the terminal (107) can be properly configured and subsequently polled based on its location within the system.

In a preferred embodiment of the present invention, a set of location-dependent attributes can be associated at each different hierarchical level with each of the various elements in the system, such as the headend (201), downstream plant (202) and upstream plant (203). Thus, by identifying the upstream plant (203), downstream plant (202) and headend (201) associated with a new set-top terminal (107), that terminal (107) can be properly configured based on the attributes assigned to the headend (201), downstream plant (202) and upstream plant (203) that are communicating with and used by that terminal (107). In this way, the terminal (107) is automatically configured properly with respect to its location within the system.

In a preferred embodiment of the present invention, each of the following elements of the cable system may have the listed attributes associated therewith. These attributes are then used to register and configure a set-top terminal associated with that respective element. As will be appreciated by those skilled in the art, each of these attributes may be assigned at any level in the hierarchy. The following is merely an exemplary association scheme. Also, many additional attributes may be defined and assigned within the system to meet operator needs.

The headend:
  (1) the frequency plan or physical channel map, also known as the carrier definition table.
  (2) the analog service code set (used for coordination with an analog system controller).
  (3) the default downstream plant.

The downstream plant:
  (1) the out-of-band (OOB) data path used by that downstream plant.
  (2) the interactive path identifier that enables interactive communication with a set-top terminal.
  (3) the virtual channel map (4) an identification of the local time zone.
(5) multicast address assignments that are used to distribute appropriate electronic program guide and other applications.
(6) an indication of whether credit can be extended.
(7) an indication of whether direct purchases of services can be made.
(8) a maximum package cost.
(9) a country code.
(10) an identification of the appropriate electronic programming guide for the region.
(11) the virtual channels to be tuned when the terminal (107) is turned on.
(12) the mechanism virtual channel to be tuned when the terminal (107) is turned off.
(13) the output channel number.
(14) the default upstream plant.
(15) the emergency alert region, and/or other relevant EAS filtering parameters.
(16) other information specific to terminals (107) purchased at retail outlets (e.g., relevant configuration parameters).

The upstream plant:
(1) further interactive path identifier that enables interactive communication with a set-top terminal.
(2) the default upstream path.
(3) available upstream frequencies which can be used by the set-top terminal to communicate upstream.

In summary, the present invention allows the system controller to automatically locate set-top terminals within the system and use that information to improve the operation of the system.

The present invention can also facilitate subscribers installing their own set-top terminals without the assistance of a technician. The system can then locate and configure the new terminal automatically with minimal or no information being required by the billing system.

In the foregoing embodiment, the set-top terminals (107) respond with the response message when receiving the request message from the controller (112). In an additional feature of the present invention, a new terminal (107), when initially powered and connected to the system, can automatically signal the controller (112) to alert the controller (112) to its presence and location within the system without waiting for a request message from the controller (112). Alternatively, the transmission of the registration request message from the terminal (107) may be initiated by a command from the user made through a user input device (not shown) on the terminal (107), e.g., a keypad on the terminal (107).

In either case, the new terminal (107) sends an unsolicited registration request message to the controller (112) requesting registration and configuration data. This allows the addition of terminals (107) to the system without first contacting the controller (112) or requiring the controller (112) to find and register the new terminal (107). A display on the set-top terminal (107) may display the status of the initialization and registration process. Eliminating the need to notify the controller (112) of the presence and need to locate a new terminal (107), consequently facilitates the purchase and installation of set-top terminals by consumers without the assistance of the cable system operator.

If the system operator wishes to exercise more control over the automatic registration of new terminals, however, the terminal (107) may be programmed to require the input of a code before it begins sending the registration request message to the controller (112).

When sending the registration request message, the new unregistered terminal will continue sending messages upstream to the controller (112) until acknowledged. The terminal (107) will try all valid frequencies and power levels until the message is eventually properly transmitted to and received by the system controller (112). As before, the controller (112) determines the upstream plant (203) conveying the registration request message in order to locate the requesting terminal (107) within the system. The controller (112) can then easily configure the terminal (107) properly based on the terminal's location in the system hierarchy. The controller (112) also assigns the appropriate attributes to the terminal (107), which can be overridden by the billing system at a later time if desired.

In a preferred embodiment of the present invention, the controller (112) will periodically broadcast a trace-route message down each of the branches, i.e., downstream plants (202), of the hierarchy. The trace-route message is different and specific for each downstream plant (202) and provides the terminals (107) connected to that downstream plant (202) with information about the part of the system, e.g., the downstream plant (202) and upstream plant (203), to which it is connected. For example, the trace-route message may specify the proper RF return path frequencies to use when signaling the controller (112) upstream, the proper upstream transmission power level to use, and phone numbers to be dialed to reach the controller (112) in systems where the terminals (107) respond to the controller (112) over telephone lines as opposed to an upstream plant (202) and ethernet (111) as in the system shown in FIGS. 1 and 2.

If the set-top terminals (107) respond to the controller (112) via a telephone line, the present invention can still provide a method of locating the terminal (107) within the system. When the terminal (107) telephones the controller (112), the terminal (107) sends a message to the controller (112) identifying the out-of-band channel (OOB) over which the terminal (107) is receiving communications from the controller (112), such as the trace-route message. The OOB channel on which the controller (112) communicates with terminals (107) may be varied between downstream plants (202). Therefore, knowing which OOB channel the terminal (107) uses to receive messages from the controller (112) can identify which downstream plant (202) the terminal (107) is connected to. The terminal (107) can then be configured accordingly.

In general, the present invention has a number of uses in building and operating a cable television system. For example, the present invention can be used to monitor the growth of the cable television system. To accomplish this, the system operator can regularly repeat the automatic location process of the present invention by having the controller (112) signal each set-top terminal (107) for a response and noting the upstream plant (203) carrying the response to confirm or establish the location of each terminal within the system. When the number of terminals (107) responding to the controller (112) through a particular upstream plant (203) reaches a certain limit, for example, when the noise on that line becomes problematic for the controller (112), the need for an additional upstream plant, and possibly a corresponding additional downstream plant, is indicated.

The system operator can then add the additional equipment necessary to the system. The controller (112) can then repeat the process of automatically locating the terminals (107) within the system to adapt to the new system configuration.

Similarly, the present invention can also be used to monitor the integrity of the system. For example, if the set-top terminals (107) which report through a particular upstream plant (203) all stop responding to the controller (112) when polled, the controller (112) has an indication that that particular upstream plant (203), or its associated downstream plant (202), is malfunctioning. Service for that portion of the system can then be scheduled. The system operator may regularly repeat the automatic terminal location process of the present invention to gauge the proper operation of the system.

Additionally, when the controller (112) has need to poll the set-top terminals (107) in the system for data, the polling algorithm can be run more efficiently if the controller (112) has an accurate indication of where each terminal (107) is within the system. Knowing the location of each terminal (107), the controller (112) can control the specific hub (102) and node (103) associated with a terminal in order to contact that terminal (107).

Consequently, a number of terminals (107), particularly those on different upstream plants (203), can be polled simultaneously, i.e., in parallel. Without knowing the terminals' locations, the controller (112) would have to poll for each terminal serially through all the downstream plants (202) to be assured of contacting the terminal (107) and to prevent collisions of upstream data from simultaneously responding terminals. Thus, the present invention allows the system controller (112) to much more efficiently poll set-top terminals (107) for data.

The present invention can also be used to automatically determine the physical and logical topology of the cable plant. The controller (112) can be used to build an association of upstream plants (203) and downstream plants (202) based on registration request messages from various terminals (107). This information could then be used either to build a representation of the cable system topology or to find errors in an existing representation of the cable system that was configured into the controller (112).

The present invention can also be used by the system operator to determine whether a subscriber has moved his or her set-top terminal (107) within the system. If the set-top terminal (107) is disconnected from the system and then reconnected at another location, the controller (112) can be programmed to note messages from the terminal (107) as coming through a different upstream plant (203) indicative of the terminal's move. This aspect of the invention can facilitate providing continued service to customers who move within the service area and prevent errors in or avoidance of billing. This also provides a means to detect unauthorized relocation of a terminal, such as to a public location where the cable system content may be used in an unauthorized manner (e.g., moving the set-top terminal to a bar for showing a major sporting event to patrons).

The present invention can also be applied to cable television systems in which the terminals (107) are entirely without the capability to communicate with the controller (112). In such a system, a trace-route message, as described above, can be periodically sent over the appropriate downstream plant (203). When a technician or subscriber is installing a new terminal, the terminal (107) is connected to the system and receives the trace-route message from the controller (112) via the downstream plant (203) to which the terminal (107) is connected.

As noted above, the information of the trace-route message is specific to the downstream plant (203) over which the trace-route message is transmitted. Additionally, the OOB channel on which the trace-route message is being carried may be specific to the downstream plant (203) to which the terminal (107) is connected. This information can then be displayed on the display of the terminal (107) and used by an installer to determine the location of the set-top terminal (107) within the system and complete the proper initialization and configuration of the terminal (107) based on that location.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A method of locating set-top terminals within a cable television system comprising:
   with a system controller, automatically determining which upstream plant of a plurality of upstream plants transmits a registration request message to said system controller from a particular set-top terminal without a request message being sent first from the system controller; and
   identifying a downstream plant associated with the upstream plant that transmits the registration request message from said set-top terminal;
   wherein a location of said set-top terminal within said system comprises an identification of said upstream plant and said associated downstream plant.

2. The method of claim 1, further comprising assigning attributes for said set-top terminal based on said location of said set-top terminal, wherein one or more different attributes are assigned to set-top terminals in different locations.

3. The method of claim 2, further comprising:
   associating attributes for said set-top terminal with each upstream plant and downstream plant in said system;
   wherein said assigning said attributes for said set-top terminal is accomplished using attributes associated with said upstream plant that transmits said registration request message and attributes associated with said downstream plant corresponding to said upstream plant that transmits said registration request message.

4. The method of claim 3, further comprising:
   associating attributes for said set-top terminal with each upstream path and headend in the system; and
   assigning attributes to a set-top terminal based on attributes associated with an upstream path and headend that correspond to that set-top terminal.

5. The method of claim 1, further comprising entering a command to said set-top terminal to cause said set-top terminal to transmit said registration request message.

6. The method of claim 1, further comprising identifying an upstream or downstream plant that is malfunctioning by identifying a group of said set-top terminals which fail to communicate with said controller, said group of set-top terminals being associated with said malfunctioning upstream or downstream plant.

7. The method of claim 1, wherein each of said upstream plants comprise a telephone line over which said set-top terminal sends said registration request message to said controller.

8. The method of claim 1, further comprising selling said set-top terminal to a subscriber through a retail outlet.

9. The method of claim 1, wherein the particular set-top terminal once connected to said cable television system, transmits the registration request message to said system controller.

10. A system for locating set-top terminals within a cable television system comprising:
- a system controller;
- a population of set-top terminals wherein at least one set-top terminal transmits a registration request message to the system controller without a request message being sent first from the system controller;
- a plurality of downstream plants with which said system controller transmits data messages to said set-top terminals; and
- a plurality of upstream plants with which said set-top terminals transmit messages to said system controller;
- wherein said controller determines a location of each set-top terminal within said system by determining which upstream plant transmits the registration request message to said system controller from a particular set-top terminal, a location of which set-top terminal has not been previously obtained by said controller; and identifying a downstream plant associated with that upstream plant that transmits registration request message from said set-top terminal.

11. The system of claim 10, wherein said controller assigns attributes for each set-top terminal based on said location of said set-top terminal.

12. The system of claim 11, wherein:
- said controller associates attributes for said set-top terminal with each upstream plant and downstream plant in said system; and
- said controller assigns attributes for each set-top terminal using said attributes associated with said upstream plant that transmits the registration request message and attributes associated with the downstream plant associated with said upstream plant that transmits registration request message.

13. The system of claim 10, wherein said set-top terminal transmits registration request message to said controller in response to a command entered by a user to said set-top terminal.

14. The system of claim 10, wherein said controller identifies an upstream or downstream plant that is malfunctioning by identifying a group of said set-top terminals that fail to communicate with said controller, said group of set-top terminals being those having a location defined with said malfunctioning upstream or downstream plant.

15. The system of claim 10, wherein each of said upstream plants comprise a telephone line over which said set-top terminal sends registration request message to said controller.

16. A system for locating set-top terminals within a cable television system, the system comprising:
- means for determining which upstream plant of a plurality of upstream plants transmits a registration request message to a system controller from a particular set-top terminal without a request message being sent first from the system controller; and
- means for identifying a downstream plant associated with the upstream plant that transmits said first message from said particular set-top terminal;
- wherein a location of said particular set-top terminal within said system comprises an identification of said upstream plant and said associated downstream plant.

17. The system of claim 16, further comprising means for assigning attributes for said set-top terminal based on said location of said set-top terminal.

18. The system of claim 16, further comprising means for automatically registering the particular set-top terminal wherein said registering comprises determining said location information for that set-top terminal being registered.

19. The system of claim 16, further comprising means for providing physical and logical topology information for said cable television system based on said location information of said terminals.

* * * * *